(12) United States Patent
Wulff et al.

(10) Patent No.: US 8,733,954 B2
(45) Date of Patent: May 27, 2014

(54) DEVICES AND METHODS FOR REDUCING VEHICLE DRAG

(71) Applicant: SmartTruck Systems, LLC, Greenville, SC (US)

(72) Inventors: Stephen Alfred Wulff, Simpsonville, SC (US); Michael Lorenzo Henderson, Piedmont, SC (US)

(73) Assignee: SmartTruck Systems, LLC, Greenville, SC (US)

( * ) Notice: Subject to any disclaimer, the term of this patent is extended or adjusted under 35 U.S.C. 154(b) by 0 days.

(21) Appl. No.: 13/940,291

(22) Filed: Jul. 12, 2013

(65) Prior Publication Data

US 2013/0301152 A1 Nov. 14, 2013

Related U.S. Application Data

(63) Continuation of application No. 13/031,882, filed on Feb. 22, 2011, now Pat. No. 8,500,291.

(51) Int. Cl.
*G02B 7/182* (2006.01)

(52) U.S. Cl.
USPC .......................................................... 359/872

(58) Field of Classification Search
CPC .............. B60R 1/06; B60R 1/08; B60R 1/082
USPC .......................................... 359/871, 872, 838
See application file for complete search history.

(56) References Cited

U.S. PATENT DOCUMENTS

| 6,010,222 A * | 1/2000 | Olson et al. .................... 359/509 |
| 2006/0238906 A1 | 10/2006 | Stonecypher |

FOREIGN PATENT DOCUMENTS

| JP | 11-029080 | 2/1999 |
| JP | 2007-076451 | 3/2007 |
| WO | WO 2009-029978 | 3/2009 |

OTHER PUBLICATIONS

Webpage at fun3d.larc.nasa.gov—5 pages.
International Search Report from PCT/US2012/024982—3 pages.

* cited by examiner

*Primary Examiner* — Euncha Cherry
(74) *Attorney, Agent, or Firm* — Dority & Manning, PA

(57) ABSTRACT

In accordance with certain embodiments of the present disclosure, a mirror assembly for a vehicle is described. The mirror assembly includes a housing defining an aerodynamic shape. The housing includes a first curved wall, a second curved wall, a bottom portion, and a top portion. The first and second curved walls extend from the bottom portion to the top portion and intersect one another to form a leading edge of the housing. The housing is dimensionally configured so that a thrust force is generated in a travel direction of the vehicle when a crossflow from the vehicle is directed around the housing.

20 Claims, 6 Drawing Sheets

DEVICES AND METHODS FOR REDUCING VEHICLE DRAG

CROSS-REFERENCE TO RELATED APPLICATIONS

The present application is a continuation of U.S. patent application Ser. No. 13/031,882, filed on Feb. 22, 2011 and entitled "Devices and Methods for Reducing Vehicle Drag", the disclosure of which is hereby incorporated by reference herein in its entirety for all purposes.

BACKGROUND

An ongoing effort to reduce drag in vehicular structures is of great importance as fuel economy becomes an increasingly large consideration in vehicular design. As the drag of a vehicle increases, the amount of fuel needed to move the vehicle also increases due to the greater energy required to overcome the drag. For instance, it has been stated that for a vehicle traveling at 70 mph, about 65% of the total fuel consumption of the vehicle's engine is used to overcome drag. Therefore, even a small reduction in the drag experienced by a vehicle traveling at highway speeds can result in a significant improvement in fuel economy.

For instance, heavy-duty vehicles such as tractor-trailers (also known as semi tractors, tractors, class 8 long haul trucks, transfer trucks, 18-wheelers, semis, etc.) have a tall and wide box-shaped profile that creates a significant amount of drag compared to other common vehicles on the road such as cars and light trucks. For instance, Table I lists common drag coefficients of road vehicles.

TABLE I

| Type of Vehicle | Drag Coefficient (Cd) |
| --- | --- |
| Low Drag Production Car | .26 |
| Typical Sedan | .3-.35 |
| Sport Utility Vehicle | .4-.5 |
| Pick-up Truck | .4-.5 |
| Conventional Class 8 long haul tractor trailers | .59-.63 |

In addition, such vehicles are generally equipped with large side mirror assemblies that extend outboard of the vehicle body structure to allow the driver to view rearward of the side mirror assembly. Although such side mirror assemblies are generally streamlined to the extent possible, because they increase the lateral profile of the vehicle, they nevertheless increase the drag on the vehicle with a corresponding reduction in fuel economy.

Thus, a need exists for improved aerodynamic mirror housings that are designed to provide drag reduction. Methods relating to the utilization of such mirror housings would also be beneficial. Retrofit kits for incorporating such mirror housings into vehicles would also be beneficial.

SUMMARY

In accordance with certain embodiments of the present disclosure, a mirror assembly for a vehicle is described. The mirror assembly includes a first curved wall, a second curved wall, a bottom portion, and a top portion. The first curved wall and second curved wall each extend from the bottom portion to the top portion and are joined to one another along a respective first side of each of the first curved wall and the second curved wall. The first curved wall, second curved wall, bottom portion, and top portion define an area comprising a reflecting surface. Each respective second side of each of the first curved wall and the second curved wall extends beyond the plane defined by the area and assists in a reduction in drag when fluid flow contacts the mirror assembly.

In still other embodiments of the present disclosure, a method of reducing drag associated with a mirror assembly for a vehicle is described. The method includes installing a mirror assembly on a vehicle. The mirror assembly is subjected to angled fluid flow from a windshield of the vehicle, wherein the mirror assembly generates net thrust.

Other features and aspects of the present disclosure are discussed in greater detail below.

BRIEF DESCRIPTION OF THE DRAWINGS

A full and enabling disclosure, including the best mode thereof, directed to one of ordinary skill in the art, is set forth more particularly in the remainder of the specification, which makes reference to the appended figures in which.

DETAILED DESCRIPTION

Reference now will be made in detail to various embodiments of the disclosure, one or more examples of which are set forth below. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment, can be used on another embodiment to yield a still further embodiment. Thus, it is intended that the present disclosure covers such modifications and variations as come within the scope of the appended claims and their equivalents.

The present disclosure is generally directed to devices and methods for reducing vehicle drag caused by vehicle side-view mirror housings. In this regard, the term vehicle can refer to any type of vehicle. In particular, however, the present disclosure specifically contemplates use with heavy trucks, such as Class 7 and 8 trucks and tractors connected thereto. The present disclosure describes improved side-view mirror housings that can result in significant reductions in vehicle drag, which can translate into improved fuel economy, reduced emissions of carbon dioxide, as well as other improved efficiencies.

As used herein, drag (also referred to as air resistance or fluid resistance) refers to forces that oppose the relative motion of an object through a fluid (a liquid or gas). Drag forces act in a direction opposite to the velocity of the vehicle. Unlike other resistive forces such as dry friction, which is nearly independent of velocity, aerodynamic drag forces are dependent on the square of the velocity. For a solid object moving through a fluid, the drag is the component of the net aerodynamic or hydrodynamic force acting opposite to the direction of the movement. Therefore drag opposes the motion of the object, and in a powered vehicle it is overcome by thrust provided by the engine through the vehicle's drive train.

Figure 1:
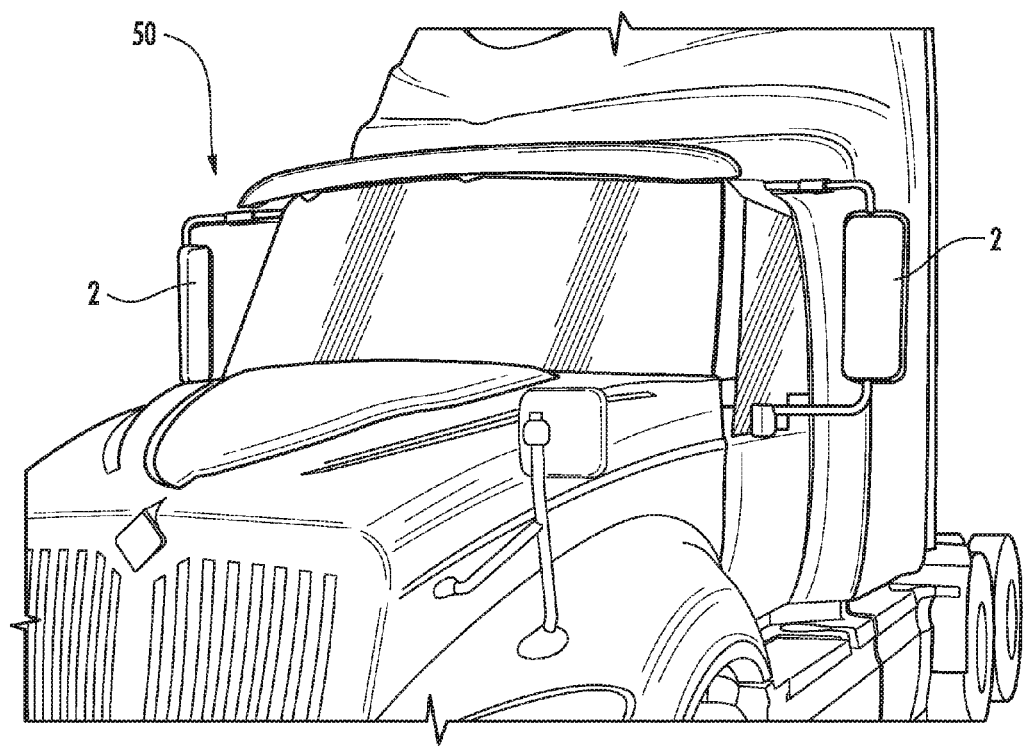
FIG. 1 illustrates a conventional long haul tractor with conventional side mirrors.

Turning to FIG. 1, a conventional tractor with sleeper compartment 50 equipped with conventional side view mirrors is illustrated. A conventional tractor with sleeper compartment is shown as opposed to cab over engine design, which is also contemplated as a type of vehicle that can be used with the mirror housings of the present disclosure.

Tractor 50 includes side mirror housings 2. As discussed previously, conventional side-view mirror housings create drag during operation of the vehicle. In accordance with the present disclosure, certain improvements are described which can reduce vehicle drag.

Figure 2A:
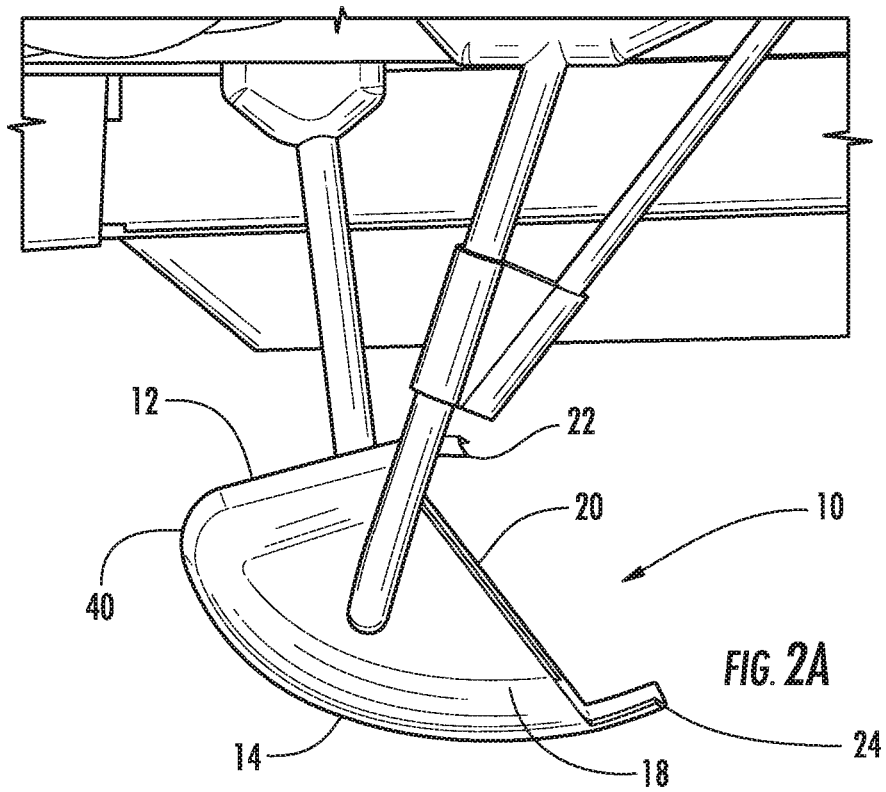
FIGS. 2A and 2B illustrate perspective views of side-view mirror housing in accordance with certain embodiments of the present disclosure.
Figure 2B:
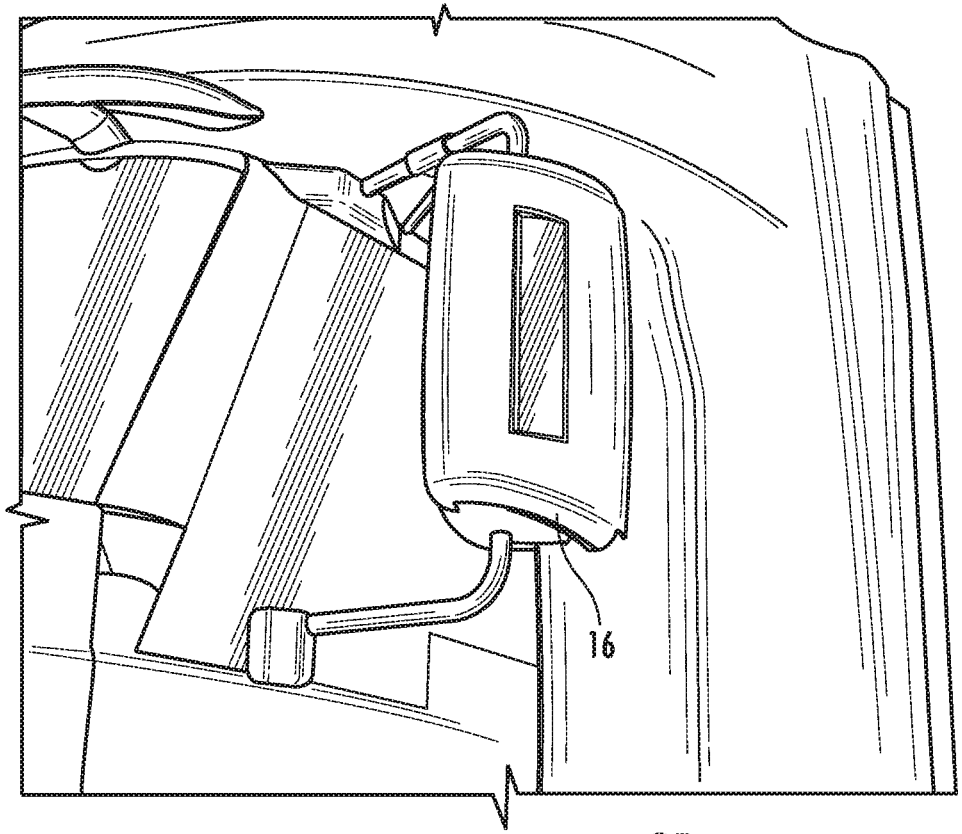
Figure 2C:
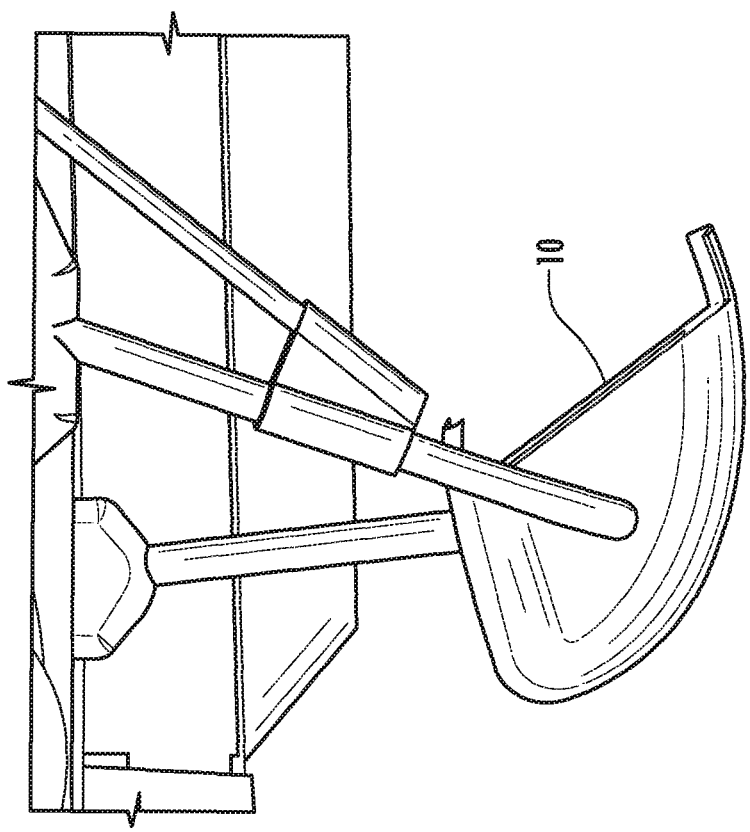
FIGS. 2C and 2D illustrate a side by side comparison of a conventional mirror housing (FIG. 2C) with a mirror housing in accordance the present disclosure (FIG. 2D)
Figure 2D:
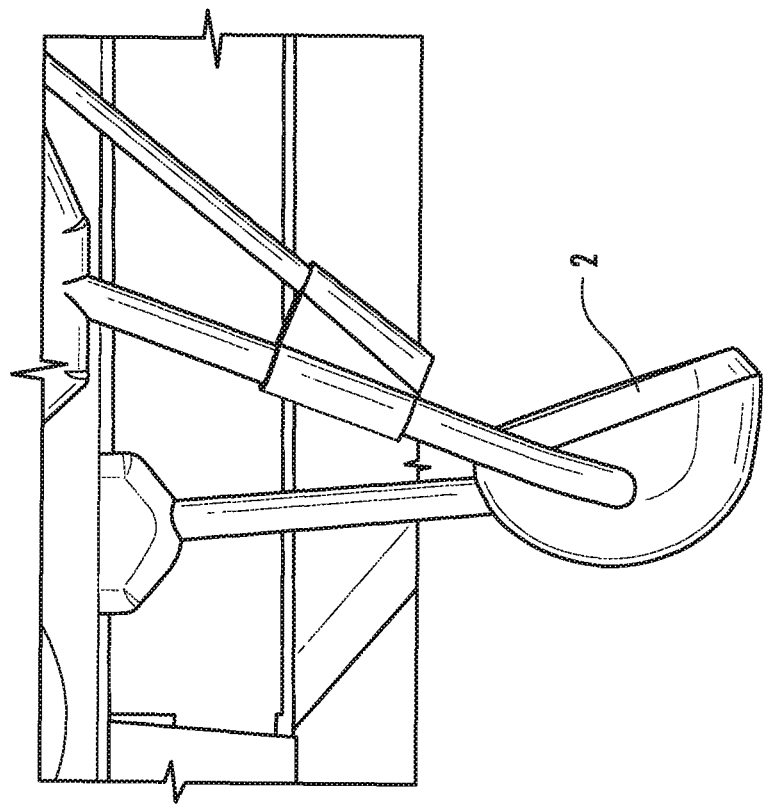

FIGS. 2C and 2D illustrate a side by side comparison of a conventional mirror housing (FIG. 2C) with a mirror housing in accordance the present disclosure (FIG. 2D).

Referring to FIGS. 2A and 2B, a side-view mirror housing 10 is illustrated in accordance with the present disclosure. The housing 10 can define an opening that accommodates one or more mirrors. Alternatively, one or more mirrors can be attached to a surface of housing 10 or can be integrally joined to housing 10.

Figure 3:
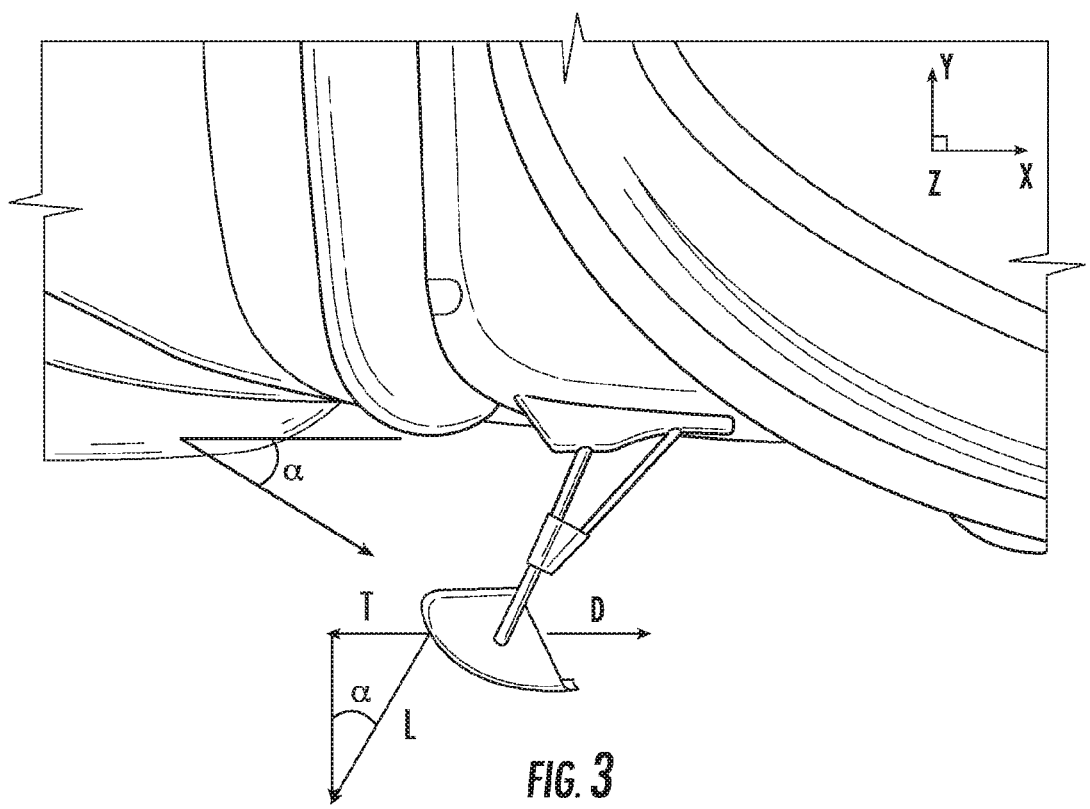
FIG. 3 illustrates a vehicle with a windshield that creates a cross flow that is a degrees from the forward direction of the traveling vehicle that passes over a side-view mirror housing in accordance with the present disclosure.

Housing 10 has a generally airfoil shaped cross-section wherein a first curved wall and second curved wall intersect to form the leading edge 40 of the housing. This unique airfoil shape is designed to maximize the lift of the mirror housing which acts perpendicularly to the local flow angle. The housing of the present disclosure can produce a substantial thrust vector as shown in FIG. 3. This thrust vector counters some of the drag produced by the mirror housing's base and thus reduces the net drag of the whole unit.

The reduction in drag is a result of a lifting force created by the shape of the mirror housing when the mirror housing receives angled air flow or crossflow from the windshield of the tractor. A component of this lifting force is directed in the same direction as the vehicle is traveling and as a result this mirror housing generates thrust. FIG. 3 illustrates the details of how this mirror housing creates lift, thrust, and reduces drag. FIG. 3 also illustrates a tractor with a windshield that creates a cross flow that is α degrees from the forward direction of the traveling vehicle. For conventional tractors, α has a range of 15 to 25 degrees. When the 15-25 degree cross flow passes over the shape of a mirror housing in accordance with the present disclosure, a lifting force (L) acting in a direction perpendicular to the cross flow is generated. A component (T) of this lifting force (L) is directed in the same direction as the traveling vehicle and acts as a thrusting force. Specifically, this thrusting force (T) is equal to the lifting force (L) times the sin of the cross flow angle.

$$T = L \times \sin(\alpha)$$

This thrusting force (T) offsets the drag force (D) created by the mirror housing. The total force impacting the entire vehicle in the direction of travel resulting from the mirror housing is the total drag (D) minus the thrusting force (T). If the cross flow angle (α) is high enough, the thrusting force can be greater than the total drag and as a result the mirror housing generates net thrust for the vehicle. Even at smaller cross flow angles (α), the thrusting force significantly reduces the drag contribution of the mirror housing to the overall vehicle.

With reference again to FIGS. 2A and 2B, mirror housing has a vertically elongated shape in which a first generally curved wall 12 and second generally curved wall 14 are joined to one another along the lengths of their respective sides and extend from bottom surface 16 to top surface 18. First curved wall 12 and second curved wall 14 have sloping surfaces that are curved along their respective widths. Second curved wall 14 is wider and has a more curved surface then first curved wall 12, which is flatter.

The walls 12, 14, bottom surface 16, and top surface 18 define an area 20 where a reflecting surface such as a mirror can be positioned. As described above, the area 20 can be an opening that accommodates one or more mirrors, which may or may not be integrally joined to housing. Alternatively, area 20 can be a surface and one or more mirrors can be attached thereto. Portions 22, 24 of each respective wall 12, 14 extends beyond the plane defined by area 20 of housing 10. Portions 22, 24 can be slightly curved towards one another. In this manner, a reduction in drag takes place when fluid flow contacts the curved surfaces of walls 12, 14.

Figure 4A:
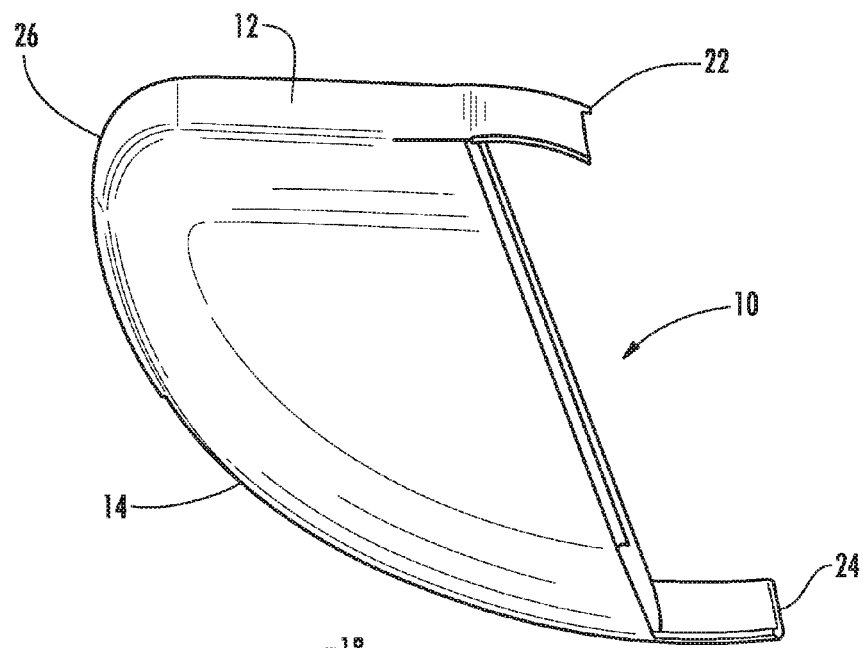
FIGS. 4A and 4B illustrate dimensions of a mirror housing in accordance with certain embodiments of the present disclosure.
Figure 4B:
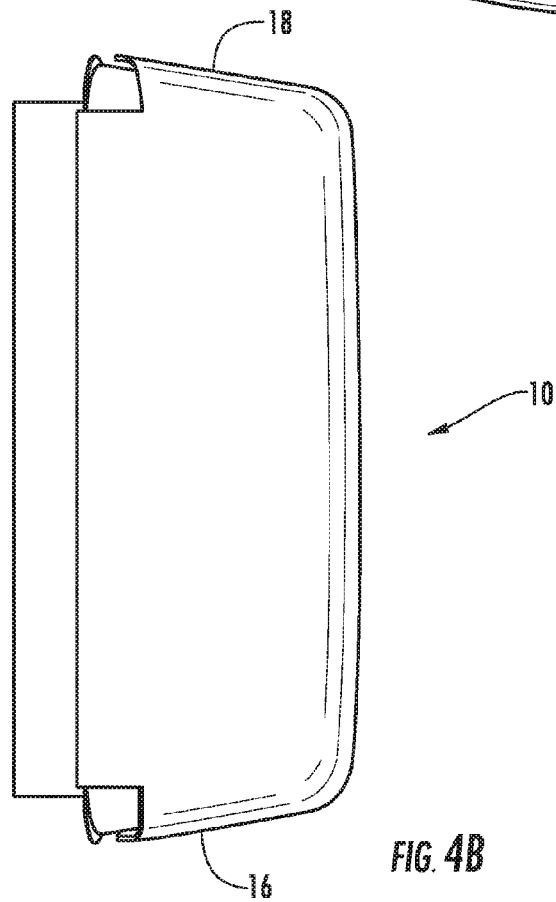

FIGS. 4A and 4B illustrate certain dimensions of a mirror housing in accordance with certain embodiments of the present disclosure. For instance, in certain embodiments, first wall 12 can have a width of from about 5 inches to about 10 inches, more particularly from about 8 inches to about 9 inches from the horizontal plane defined by the intersection 26 of first wall 12 and second wall 14 to a parallel horizontal plane defined by the tip of portion 22. Portion 22 can have a width that is at least 10% of the width from such horizontal plane defined by the intersection 26 of first wall 12 and second wall 14 to a such parallel horizontal plane defined by the tip of portion 22, and more particularly at least 15% of such width, and still more particularly at least 25% of such width.

Second wall 14 can have a width of from about 10 inches to about 15 inches, more particularly from about 11 inches to 12 inches from the horizontal plane defined by the intersection 26 of first wall 12 and second wall 14 to a parallel horizontal plane defined by the tip of portion 24. Portion 24 has a width that is at least 5% of the width from such horizontal plane defined by the intersection 26 of first wall 12 and second wall 14 to a such parallel horizontal plane defined by the tip of portion 24, and more particularly at least 10% of such width, and still more particularly at least 15% of such width. The distance from portion 22 to portion 24 can be from about 6 inches to about 12 inches, more particularly from about 9 inches to about 10 inches. For instance, portions 22, 24 can have a width from about ½ inch to about 3 inches and a height from about 16 inches to about 28 inches. In addition, portions 22, 24 can have a nominal material thickness from about 0.14 inches to about 0.25 inches.

The height of first wall 12 and second wall 14 from bottom surface 16 to top surface 18 is from about 20 inches to about 30 inches, more particularly from about 23 inches to about 25 inches. The overall width, height, and thicknesses of mirror housing 10 can be comparable to conventional side-view mirror housings, making them compatible as replacement mirror housings.

Figure 5A:
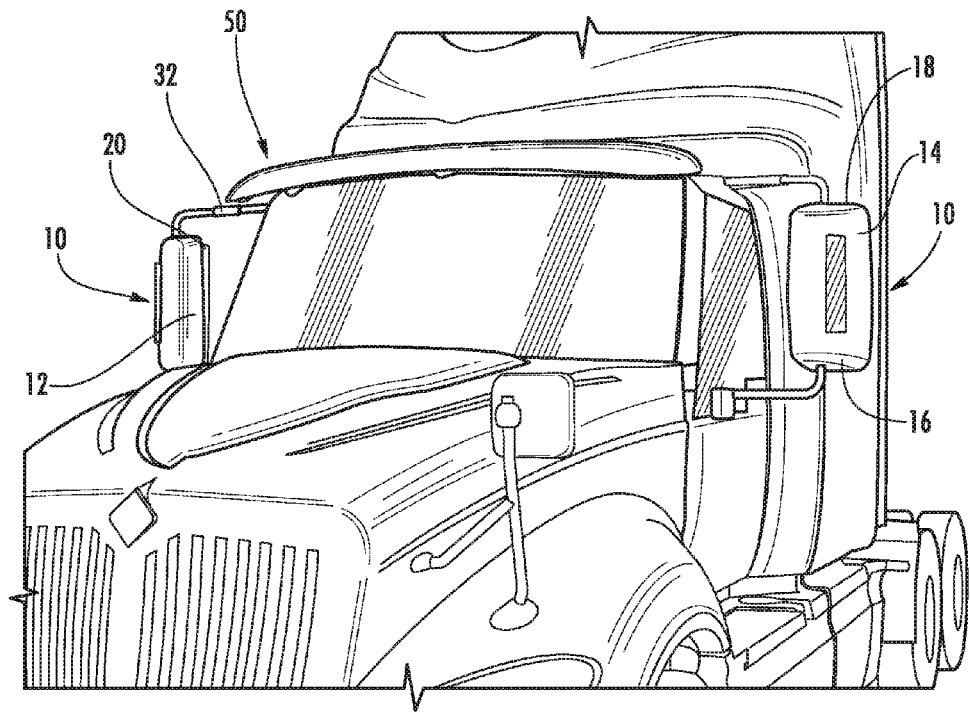
FIGS. 5A and 5B illustrate perspective views of tractors equipped with side-view mirror housings in accordance with certain embodiments of the present disclosure.
Figure 5B:
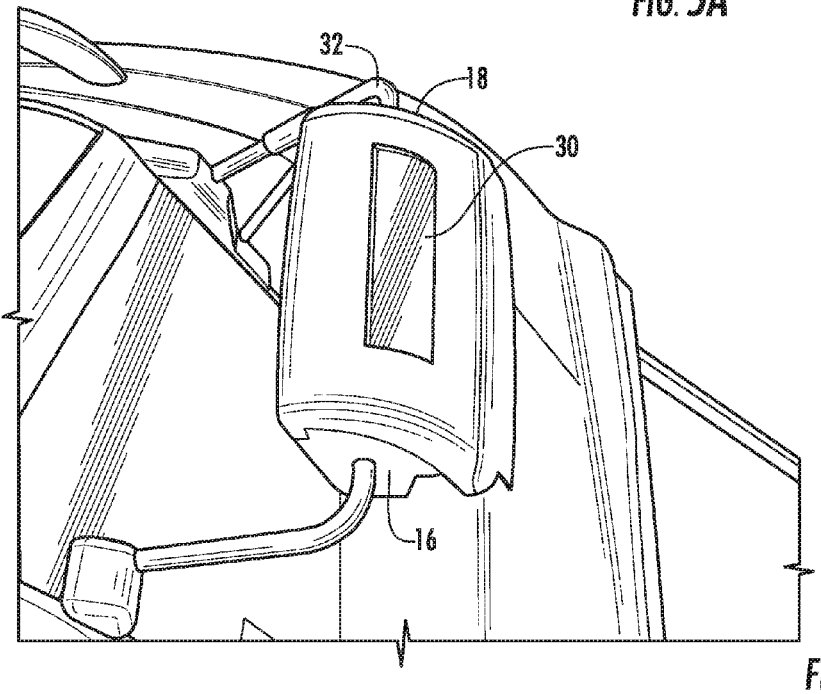

Referring to FIGS. 5A and 5B, a mirror housing 10 in accordance with the present disclosure is shown installed on a tractor 50. The housing 10 can be provided in pairs and can be configured as would be understood by one of ordinary skill in the art so as to replace conventional side-view mirror housings of a vehicle.

The housing 10 can also include other components that would be typical in conventional mirror housings. For instance, as described above a mirror (not illustrated) can be positioned at area 20 defined by walls 12, 14, bottom surface 16, and top surface 18. Reflector or lighting kit 30 can positioned on forward facing curved surface of first wall 12 and/or second wall 14. In addition, suitable mounting hardware 32 can be positioned in any suitable location as would be appreciated by one of ordinary skill in the art.

All of the above-described elements can be formed from any suitable material as would be known and appreciated in the art. For instance, metals, plastics, or the like can be utilized. Unless otherwise stated, the elements can include a smooth outline to further reduce drag. In addition, it should be appreciated that any suitable mounting hardware including common fasteners (such as nuts, bolts, or the like), latches, hooks, ties, adhesives, magnets, or the like, or any other conventional securing methods as would be known in the art can be utilized in connection with the present disclosure.

The following examples are meant to illustrate the disclosure described herein and are not intended to limit the scope of this disclosure.

EXAMPLES

Aerodynamic drag associated with side-view mirror housings in accordance with certain embodiments of the present disclosure were assessed using NASA's Fully Unstructured Navier-Stokes 3D (FUN 3D) Computational Fluid Dynamics (CFD) model described further at http://fun3d.larc.nasa.gov. In addition, the aerodynamic drag reductions associated with side-view mirror housings and components of the present disclosure were demonstrated using standard high fidelity coast down test designed to have better accuracy than atypical industry standard technique as described in the Society of Automotive Engineer's (SAE) J2453 protocol. The tests were conducted at the Kennedy Space Center located at Kennedy Space Center, Fla. and at Michelin Tire Company Proving Grounds in Laurens, S.C. The coast down tests measure the amount of time it takes a vehicle to slow down from 65 to 80 mph to approximately 10 mph. The test vehicle is accelerated to 65 or 80 mph by the driver and then put in neutral. The test vehicle is then coasted along a straight line until it reaches zero mph or reaches the end of the roadway. The amount of time it takes a vehicle to perform the coast down test is a direct result of the vehicle's aerodynamic drag, tire rolling resistance, and mechanical drivetrain system frictional losses. During the coast down tests, the coast down times of the test vehicle equipped with conventional side view mirrors, as shown in FIG. 1C, was compared to the coast down times of the same vehicle equipped with the side view mirror housings in accordance with the present disclosure, as shown in FIGS. 5A and 5B. The coast down times are then converted into aerodynamic drag coefficients.

Results of computational fluid dynamics modeling and simulations and Michelin Proving grounds and Kennedy Space Center coast down testing are provided in Table II. In particular, Table II shows the drag coefficient of a tractor-trailer equipped with traditional mirror housings compared to the same tractor-trailer equipped with a mirror housing as described in accordance with the present disclosure.

TABLE II

|  | Tractor-Trailer equipped with conventional side view mirrors | Tractor-Trailer equipped with mirror housing in accordance with the present disclosure | Percent Improvement |
| --- | --- | --- | --- |
| Cd as calculated by NASA's FUN 3-D Computational Fluid Dynamics Software | .5887 | .5769 | 2% |
| Cd as calculated by Michelin and Kennedy coast down testing | .587 | .578 | 1.53% |

In the interests of brevity and conciseness, any ranges of values set forth in this specification are to be construed as written description support for claims reciting any sub-ranges having endpoints which are whole number values within the specified range in question. By way of a hypothetical illustrative example, a disclosure in this specification of a range of 1-5 shall be considered to support claims to any of the following sub-ranges: 1-4; 1-3; 1-2; 2-5; 2-4; 2-3; 3-5; 3-4; and 4-5.

These and other modifications and variations to the present disclosure can be practiced by those of ordinary skill in the art, without departing from the spirit and scope of the present disclosure, which is more particularly set forth in the appended claims. In addition, it should be understood that aspects of the various embodiments can be interchanged both in whole or in part. Furthermore, those of ordinary skill in the art will appreciate that the foregoing description is by way of example only, and is not intended to limit the disclosure.

What is claimed is:

1. A mirror assembly for a vehicle, comprising:
a housing defining an aerodynamic shape, the housing including a first curved wall, a second curved wall, a bottom portion, and a top portion, the first and second curved walls extending from the bottom portion to the top portion and intersecting one another to form a leading edge of the housing, the first and second curved walls each extending from the leading edge to an edge portion disposed adjacent to a reflecting surface of the mirror assembly, each of the first and second curved walls defining a continuously curved aerodynamic surface between the leading edge and the corresponding edge portion, wherein the housing is dimensionally configured so that a thrust force is generated in a travel direction of the vehicle when a crossflow from the vehicle is directed around the housing.

2. The mirror assembly of claim 1, wherein the housing is dimensionally configured so that the thrust force offsets a drag force acting on the housing when the crossflow is directed around the housing, thereby generating a net thrust in the travel direction of the vehicle.

3. The mirror assembly of claim 1, wherein the thrust force increases as an angle at which the crossflow is directed towards the housing is increased.

4. The mirror assembly of claim 3, wherein the angle ranges from about 15 degrees to about 2.5 degrees.

5. The mirror assembly of claim 1, wherein the first curved wall, the second curved wall, the bottom portion, and the top portion define an area comprising the reflecting surface, wherein the edge portion of at least one of the first curved wall or the second curved wall extends beyond a plane defined by the area.

6. The mirror assembly of claim 5, wherein the edge portion is curved slightly inwardly in a direction of the reflecting surface.

7. The mirror assembly of claim 5, wherein the edge portion extends beyond the plane defined by the area by a distance ranging from about 1 inch to about 5 inches.

8. The mirror assembly of claim 5, wherein the edge portion extends beyond the plane defined by the area by a distance ranging from about 2 inches to about 3 inches.

9. The mirror assembly of claim 5, wherein a width of the housing between the edge portion and the leading edge ranges from about 5 inches to about 10 inches.

10. The mirror assembly of claim 5, wherein a width of the housing between the edge portion and the leading edge ranges from about 10 inches to about 15 inches.

11. A mirror assembly for a vehicle, comprising:
a housing comprising a first curved wall, a second curved wall, a bottom portion, and a top portion, the first and second curved walls extending from the bottom portion to the top portion and intersecting one another to form a leading edge of the housing, wherein the first curved wall, the second curved wall, the bottom portion, and the top portion define an area comprising a reflecting surface, and wherein a portion of one of the first curved wall or the second curved wall extends beyond a plane defined by the area.

12. The mirror assembly of claim 11, wherein the housing is dimensionally configured such that a thrust force is generated in a travel direction of the vehicle when a crossflow from the vehicle is directed around the housing.

13. The mirror assembly of claim 12, wherein the housing is dimensionally configured so that the thrust force offsets a drag force acting on the housing when the crossflow is directed around the housing, thereby generating a net thrust in the travel direction of the vehicle.

14. The mirror assembly of claim 12, wherein the thrust force increases as an angle at which the crossflow is directed towards the housing is increased.

15. The mirror assembly of claim 14, wherein the angle ranges from about 15 degrees to about 25 degrees.

16. The mirror assembly of claim 11, wherein the portion is curved slightly inwardly in a direction of the reflecting surface.

17. The mirror assembly of claim 11, wherein the portion extends beyond the plane defined by the area by a distance ranging from about 1 inch to about 5 inches.

18. The mirror assembly of claim 11, wherein the portion extends beyond the plane defined by the area by a distance ranging from about 2 inches to about 3 inches.

19. The mirror assembly of claim 11, wherein a width of the housing between an end of the portion and the leading edge ranges from about 5 inches to about 10 inches.

20. The mirror assembly of claim 11, wherein a width of the housing between an end of the portion and the leading edge ranges from about 10 inches to about 15 inches.

* * * * *